(12) United States Patent
Dunsmore et al.

(10) Patent No.: US 7,457,767 B1
(45) Date of Patent: Nov. 25, 2008

(54) PAY AT THE TABLE SYSTEM

(75) Inventors: Rodney Charles Dunsmore, Austin, TX (US); Steven Lee Harrington, Austin, TX (US); Mark Christan Speich, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 2005 days.

(21) Appl. No.: 09/679,781

(22) Filed: Oct. 5, 2000

(51) Int. Cl.
G06Q 20/00 (2006.01)

(52) U.S. Cl. .............................. 705/17; 705/16; 235/380

(58) Field of Classification Search .................... 703/15, 703/16, 17, 19, 20, 21, 26; 235/380, 483, 235/486
See application file for complete search history.

(56) References Cited

U.S. PATENT DOCUMENTS

| 4,396,985 | A | 8/1983 | Ohara ......................... 364/405 |
| 4,530,067 | A | 7/1985 | Dorr ........................... 364/900 |
| 5,262,938 | A | 11/1993 | Rapoport et al. ............. 364/401 |
| 5,355,115 | A | 10/1994 | Goor et al. ................... 340/321 |
| 5,838,798 | A | 11/1998 | Stevens, III .................. 380/49 |
| 5,933,812 | A | 8/1999 | Meyer et al. .................. 705/15 |
| 5,979,604 | A | 11/1999 | Pinna et al. ................... 186/39 |
| 6,076,079 | A | 6/2000 | Boston et al. ................. 705/400 |
| 6,088,681 | A | 7/2000 | Coleman et al. ............... 705/15 |
| 6,412,691 | B1 | 7/2002 | Shiobara et al. .............. 235/380 |
| 6,502,756 | B1 | 1/2003 | Fåhraeus ...................... 235/494 |
| 2002/0073234 | A1 | 6/2002 | Ma ............................ 709/246 |
| 2002/0087478 | A1 | 7/2002 | Hudd et al. .................... 705/64 |

FOREIGN PATENT DOCUMENTS

WO     WO9504979     9/1994

OTHER PUBLICATIONS

Introduction to Accounting: An Integrated Approach; Ainsworth; Michael W. Junior; 1997; p. 319.*

* cited by examiner

*Primary Examiner*—Elaine Gort
(74) *Attorney, Agent, or Firm*—Duke W. Yee; Jeffrey S. LaBaw; Gerald H. Glanzman

(57) ABSTRACT

Patrons at a restaurant or bar can pay at their table using credit cards, without involving the restaurant or bar cashier and/or wait staff. Patrons are assisted using this system in dividing the bill by displaying the amount due (including tax) and allowing each patron to enter the amount they wish to pay. When the initial bill is presented, a balance due will be displayed and the indication will be provided that the bill has yet to be paid in full. As each transaction is entered, a running total will be displayed indicating the remaining balance due. When the running total reaches zero, the bill is paid in full, and an indication will be provided, such as by illuminating a green indicator light or by displaying a balance due of $0.00.

27 Claims, 6 Drawing Sheets

FIG. 6

| | | |
|---|---|---|
| #1 Plate | $ | 6.95 |
| #4 Dinner | $ | 9.50 |
| Tea | $ | 1.20 |
| Coffee | $ | 1.20 |
| Subtotal | $ | 18.85 |
| Tax (8.25%) | $ | 1.56 |
| Total | $ | 20.41 |

15% Gratuity

20% Gratuity

ENTER

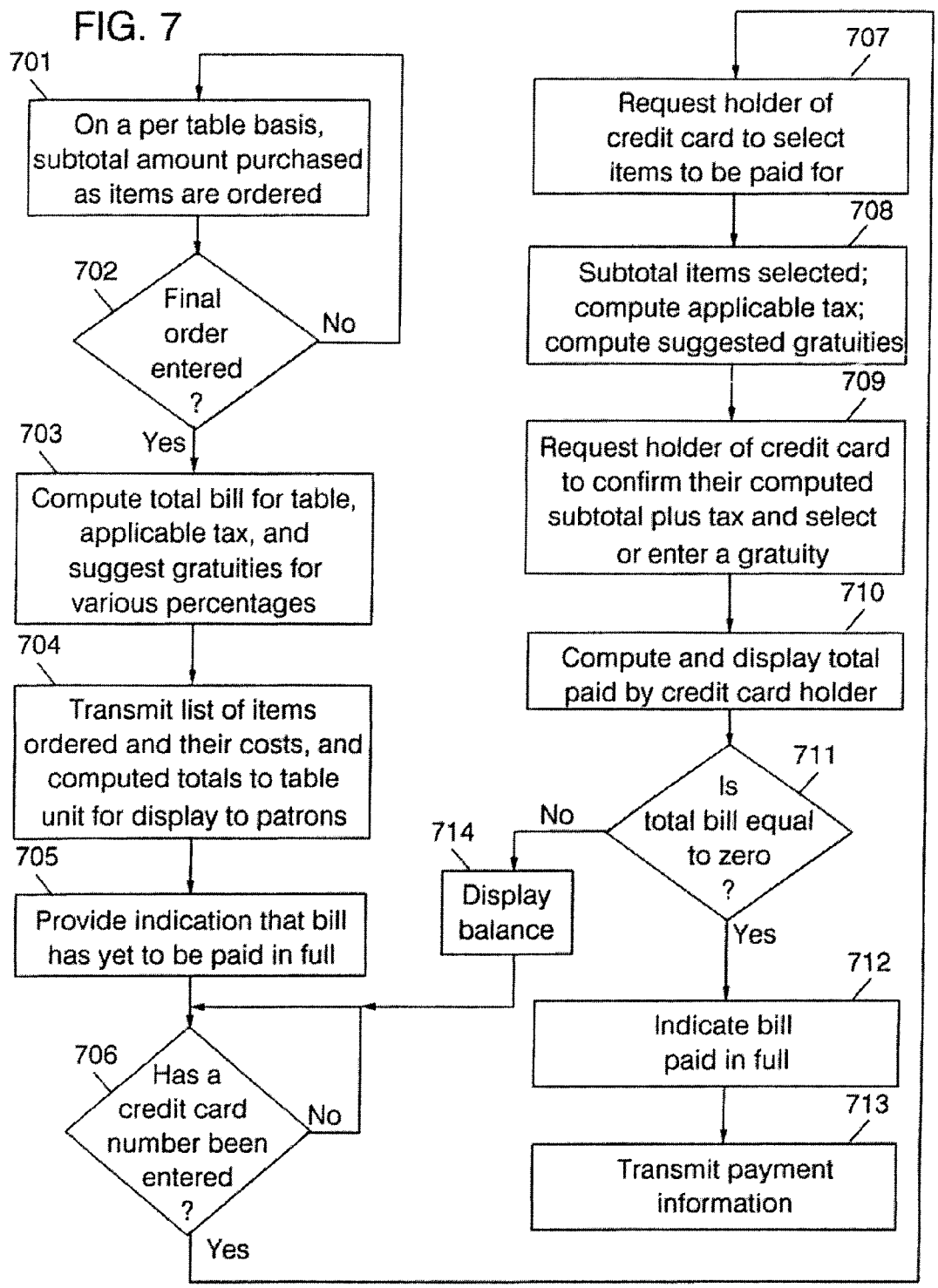

PAY AT THE TABLE SYSTEM

TECHNICAL FIELD

The present invention relates in general to information processing systems, and in particular, to a point-of-sale terminal permitting restaurant patrons to individually pay their portion of the restaurant bill.

BACKGROUND INFORMATION

Many times has the following scenario been encountered. A group of patrons dining at a restaurant receive the bill, and then go through the complicated task of determining how much each patron owes on the bill, including applicable tax and an allotted portion of the gratuity to be paid to the wait staff. Moreover, many restaurants and bars do not accept separate payments for items on a single bill, mostly because splitting a bill often results in errors and in taking time away from the wait staff being able to serve other customers within the restaurant.

Thus, there is a need to address these competing interests, whereby the patrons are able to split a bill without such a process unduly burdening the wait staff, and adversely impacting the restaurant's efficiency.

U.S. Pat. No. 5,933,812 to Meyer, et al. provides a portable transaction terminal system which provides for complete data entry at the guest table of an eating and drinking establishment. The terminal has the facility for entering all the information needed to complete the transaction, including the server's gratuity. This portable transaction terminal system is nothing more than the credit card payment devices found at almost every commercial establishment, such as grocery stores, permitting a total bill to be paid using a patron's credit card. Meyer, et al. provides an additional functionality in permitting the patron to pay a gratuity in addition to the total bill. What Meyer, et al. does not disclose is an ability for the bill to be split among the various patrons at a table and for each of such patrons to individually pay their desired portion using a credit card.

SUMMARY OF THE INVENTION

The foregoing need is addressed by the present invention which allows diners in a restaurant to pay at the table using credit cards, without involving the restaurant cashier and/or the wait staff. The present invention will assist patrons in dividing the bill by displaying the amount due (including tax) and allowing each patron to enter the amount which he or she wishes to pay. When the initial bill is presented, a balance due will be displayed and a red indicator light may be illuminated, indicating that the bill is not yet paid in full. As each transaction is entered, a running total will be displayed indicating the remaining balance due. When the running total reaches zero, the bill is paid in full (including the tax, but not necessarily an optional gratuity). The present invention may indicate that the bill has been paid in full by illuminating a green indicator light and by displaying a balance due of $0.00.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 illustrates an alternative point-of-sale terminal for permitting patrons to pay their portion of the bill using a credit card at a touch-sensitive display screen; and FIG. 7 illustrates a flow diagram of another alternative embodiment of the present invention.

DETAILED DESCRIPTION

Figure 1:
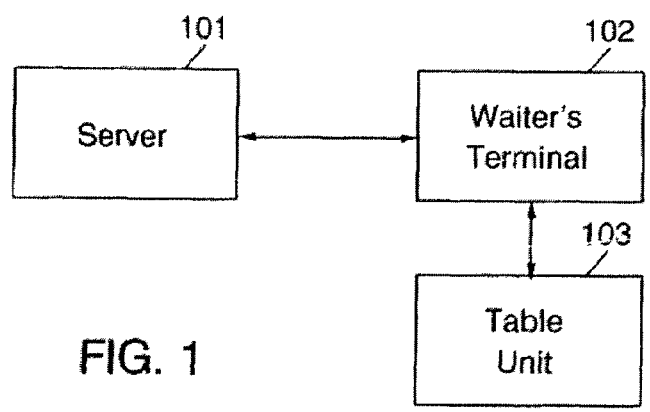
FIG. 1 illustrates a network implementing the present invention.

In the following description, numerous specific details are set forth such as specific point of sale terminal configurations, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The following exemplified scenario is addressed to the use of the present invention. A group of patrons are dining at a restaurant, where each of the patrons orders various items, which are placed on a single bill by the wait staff. The total bill is then presented to the table of patrons, who decide that they wish to split the bill and pay on a separate basis. The present invention has the advantage of permitting this process of paying separately without unduly burdening the restaurant wait staff.

Note, though the present invention is described with respect to a restaurant, it is applicable to any situation where a plurality of patrons wish to pay separate portions of a bill.

Referring to FIG. 1, in today's typical restaurant environment, the old fashioned cash register has been replaced by a computer server 101, which is coupled to a waiter's or cashier's terminal 102 where orders from various patrons at tables are entered into the system on a per table basis. The server 101 keeps track of such orders, and may provide various other functionalities not pertinent to the present invention, such as being linked to a software accounting system. As a waiter receives orders for items of food and beverages from patrons at a particular table, the waiter will input such items at the waiter's terminal 102, which then keeps track of a running total bill for each table within the restaurant establishment. For example, once the patrons at a particular table have completed their main course, the waiter will ask the patrons if they wish to now order desert and/or coffee. If any orders of desert and/or coffee are made by any of the patrons, the waiter will enter such orders at the waiter's terminal 102, and such items will be added to the total bill for that table.

The typical method for presenting the total bill for patrons at a table is for the waiter to print out the total bill at the waiter's terminal 102 and present the paper invoice to the patrons at the table. The reason there is typically a single bill presented to the patrons is that most restaurants do not permit separate checks to be issued to the various patrons at a table since this not only complicates an already complicated job for the waiter, but can also result in more errors being made by the waiter in keeping track of each of the patron's individual orders, and slows down each waiter's efficiency in being able to provide personal service to each of their respective tables. These inefficiencies can further result in human errors being made by the wait staff in bringing incorrect meal orders to the patrons at their tables, and can also slow down the throughput of patrons through the restaurant where it takes longer for a table of patrons to be served and the payment transaction to be completed so that the table can be cleared for the next group of patrons.

Though U.S. Pat. No. 5,933,812 to Meyer, et al. discussed previously provides for an entire table of patrons to pay the total bill using a credit card, including the gratuity, it does not provide an ability for the check to be split among the various patrons, and for those individual patrons to then pay their desired portion of the bill. This deficiency is addressed by the present invention.

Again referring to FIG. 1, the present invention provides a table unit 103, which is either brought by the waiter to the table with the presentation of the total bill, or is permanently resident at the table. Nevertheless, the table unit 103 is in communication with the waiter's terminal 102 and the server 101 so that the total bill can be displayed to the patrons at the table and for permitting the patrons to individually pay what they desire their portion of the bill to be.

Figure 2:
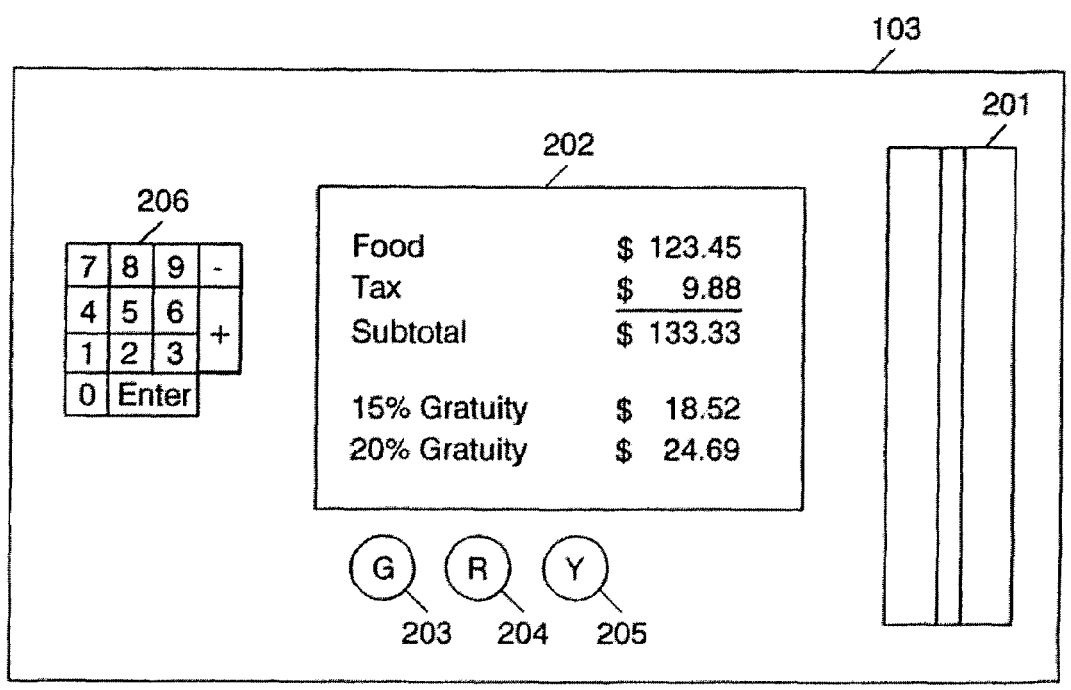
FIG. 2 illustrates a point-of-sale terminal for allowing patrons to pay their portion of the bill using a credit.

Referring to FIG. 2, there is illustrated one example of such a table unit 103, which includes a credit card reader 201 through which a credit card (not shown) can be slid through for reading the account information on the magnetic strip of the credit card, in a manner that is well known in the art. Table unit 103 also includes a display 202, which will display information pertaining to the food bill for the table of patrons, in a manner as further described below. Also illustrated in FIG. 2 are green light 203, red light 204, and yellow light 205, which are also further discussed below.

Figure 4:
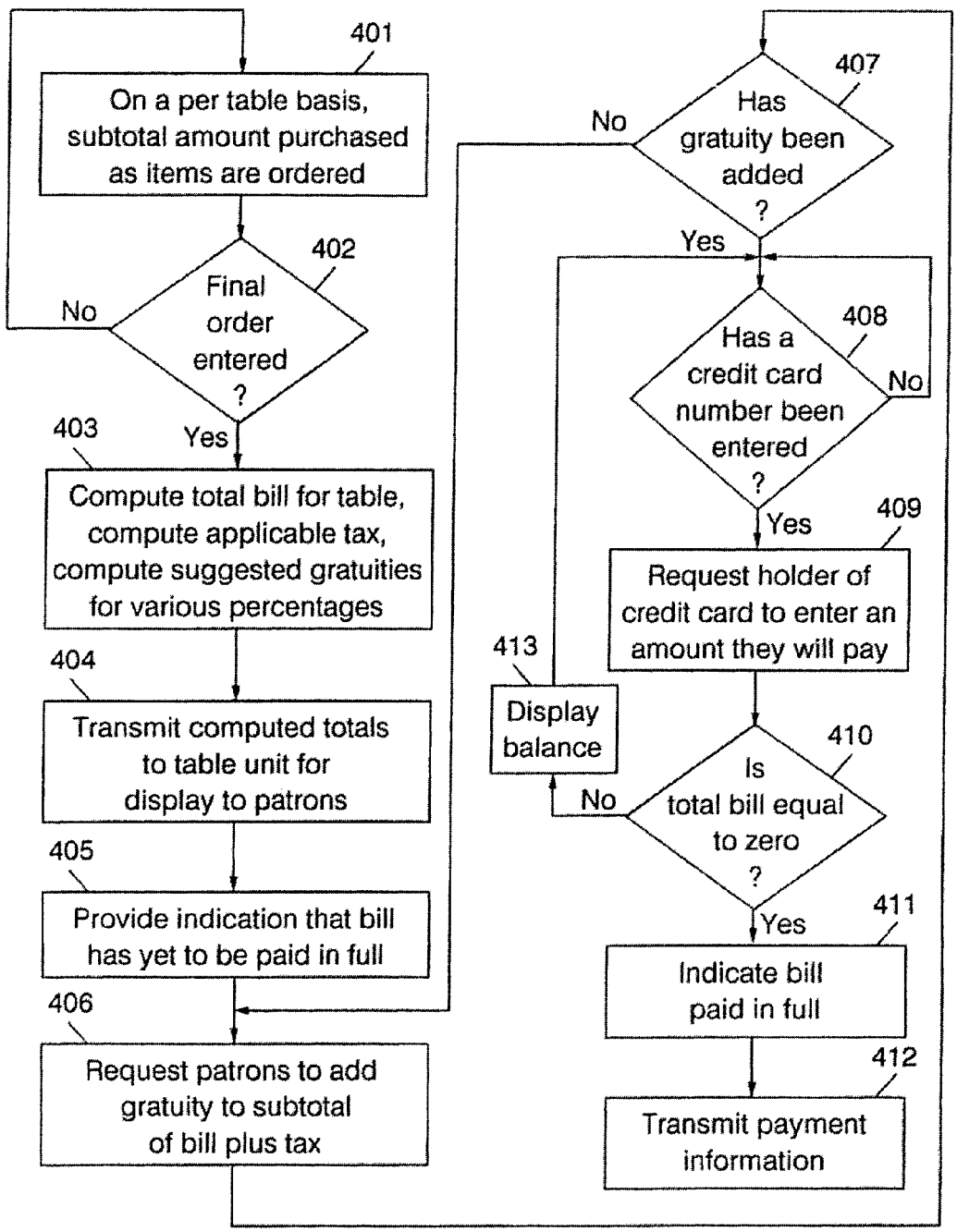
FIG. 4 illustrates a flow diagram of one embodiment of the present invention.

As discussed previously, a waiter serving a particular table of patrons will enter in each item ordered by the patrons at the table at the waiter's terminal 102. The system illustrated in FIG. 1 will keep track of the itemized list of items ordered by the table of patrons, including a running subtotal indicating the total amount owed by the table of patrons for the items they ordered. Referring to FIG. 4, step 401 shows that on a per table basis, such a subtotal amount of items purchased is maintained at the waiter's terminal 102. When the waiter for the table of patrons has determined that the patrons are no longer going to order any further items, then the waiter can provide some type of input at the waiter's terminal 102 that the final order has been entered (step 402). In step 403, the system will compute the total bill for the table of patrons, compute any applicable tax to be charged along with the total bill, and can optionally compute suggested gratuities to be paid by the patrons at the table for various suggested percentages. For example, gratuities can be calculated based on a 15% factor, a 20% factor, etc. In step 404, the computed totals are then transmitted from the waiter's terminal 102 to the table unit 103 for display to the patrons on display 202 on unit 103. As an example, a total food bill of $123.45, along with the applicable tax for the bill of $9.88 with a resulting subtotal of $133.33 may be displayed on display 202. Furthermore, the suggested gratuities of 15% ($18.52) and 20% ($24.69) may also be displayed on display 202.

Next, in step 405, an indication can be provided to either the waiter at waiter's terminal 102 or the patrons at table unit 103 that the bill has yet to be paid in full by the patrons. One example of such an indication would be the illumination of an LED light 204 on unit 103. Another indication might be merely some wording displayed on display 202 stating that the bill has yet to be paid in full. This indication also provides the same type of information to the wait staff as to whether the patrons have completed the payment transaction. Next, in step 406, a request is made to the patrons to add their desired gratuity submission to the subtotal of the bill plus the tax. Such a request can be performed in the manner of a message displayed on display 202. The patrons can then enter in any amount of gratuity they wish, including selecting one of the suggested gratuity amounts. The entry of such an amount can be performed using numerical key pad 206. Alternatively, display screen 202 may be a touch-sensitive screen, which are well known in the art. The result is that a grand total of food, tax, and gratuity will then be displayed for payment by the patrons. In step 407, the system determines whether the gratuity has been added. If not, the process merely returns to step 406. However, if the gratuity has been then added by the patrons, the process proceeds to step 408 to determine whether one of the patrons has entered a credit card number. This can be performed by a patron swiping their credit card (not shown) through credit card reader 201, or an option can be implemented whereby the credit card number of a patron is entered using the input keypad 206. The system will merely loop upon itself if a credit card number has yet to be entered. Note, while the system merely loops upon itself waiting for a patron to enter a credit card number or to swipe their credit card through credit card reader 201, the indication provided in step 405 visually remains. For example, the red light 204 will remain illuminated. In step 409, if a patron has swiped their credit card through credit card reader 201, the system, in step 409, will request the holder of that credit card to enter an amount they wish to pay using that credit card number. Such a request can be displayed to the patron using display 202. The patron associated with that credit card number can then enter in an amount they are paying on that credit card using the input keypad 206. In step 410, the system will deduct the amount entered by the patron from the grand total bill, and determine if the amount entered by the patron results in a payment of the entire bill or merely a portion thereof. If the amount entered by the patron associated with the credit card swiped through credit card reader 201 is less than the total bill, then in step 413, the remaining balance still owed by the table of patrons will be displayed on display 202. The system will then wait for another credit card number to be entered in step 408. Theoretically, such a credit card number can be the same credit card number as entered previously where the same patron decides that they are going to pay the next portion of the balance. However, what the first portion of the invention is designed for is to enable another one of the patrons within the group at the table to then enter in their own credit card by swiping it through credit card reader 201 and then enter in an amount they wish to pay on the remaining balance in step 409. Again, in step 410, this new amount entered by the subsequent patron is then subtracted from the remaining balance to determine if the total bill has now been paid at the table. If a balance still remains, the process continues through steps 413, 408, 409 and 410 and so on until the total bill is paid of the food, tax, and selected gratuity. Once the total bill is computed to have been paid by the group of patrons at the table, in step 411, an indication will be provided that the bill has now been paid in full. This may be shown by the discontinuance of the illumination of the red lamp 204, and the illumination of a green lamp 203 on the unit 103. Furthermore, some other type of indication may be provided at the waiter's terminal 102 to indicate that the patrons have now paid the bill in full. Thereafter, in step 412, the payment information entered by each of the patrons with respect to their credit card numbers and accounts, will then be transmitted by the establishment from server 101 over a network to the various financial institutions associated with the credit card accounts of the patrons.

Figure 5:
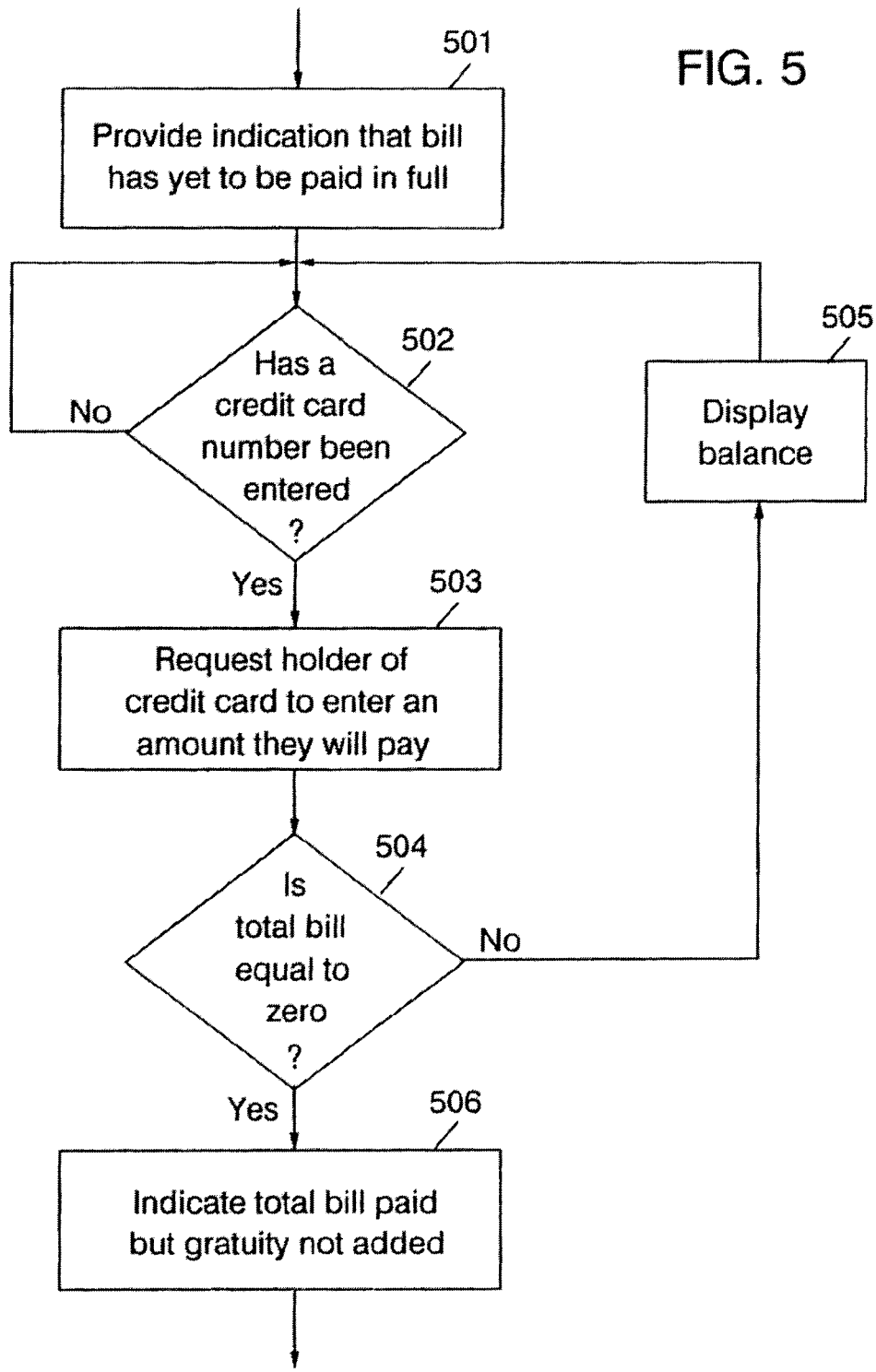
FIG. 5 illustrates a flow diagram of an alternative embodiment of the present invention.

Referring to FIG. 5, there is illustrated an alternative embodiment of the present invention, which can be used to replace steps 405-413 in FIG. 4. Essentially, these steps may be implemented to permit each of the patrons to pay a portion of the total food bill plus tax, but not the gratuity. From step 404, the process will proceed to step 501 to provide an indication that the bill has yet to be paid in full. This step may be performed in a manner similarly as discussed above with respect to step 405. Thereafter, steps 502-505 can be implemented in a manner as similarly described above with respect to steps 408-410 and 413 whereby each of the patrons at the table pays their desired portion of the food bill plus tax portion. Once that total portion has been paid in full, the process will then proceed to step 506 to indicate that the total bill has been paid, but that a gratuity has yet to be added. This indication can be implemented using a displayed message or by illuminating a yellow lamp 205 on unit 103. Thereafter, the patrons can then decide what amount of gratuity they wish to pay to the wait staff, which can be performed using cash collected from each of the patrons to be deposited on the table, or by repeating the process described above with respect to steps 502-505 for a gratuity amount to be selected and agreed upon by the patrons.

Referring to FIG. 6, there is illustrated an alternative embodiment of the present invention whereby a table unit 601 is implemented with a touch-sensitive display screen 603, and a credit card reader 602. The credit card reader 602 functions in a manner as similarly described above with respect to the credit card reader 201 in unit 103. However, the display 202 and the key input pad 206 are replaced by the touch-sensitive display screen 603. The touch-sensitive screen 603 operates in a manner well known in the art whereby a user can touch various items displayed on the screen for selection of those items. What table unit 601 enables the system to do is to list every item ordered by the table of patrons on touch-sensitive display screen 603, whereby each of the patrons can then select the items they wish to pay for, and enter a gratuity they wish to pay for on each of their individual credit cards.

Referring to FIG. 7, in step 701, on a per table basis, a subtotal amount is calculated for the items ordered and purchased by a table of patrons. Steps 702 and 703 are then performed in a manner as similarly described above with respect to steps 402 and 403. Thereafter, in step 704, the list of items ordered by the patrons at the table and their respective costs are then displayed on touch-sensitive display 603. Additionally, the subtotal for the food items will be displayed along with any applicable tax, resulting in a total displayed for the food and tax. Additionally, suggested gratuity amounts may also be displayed. An example of such a display of information is illustrated in FIG. 6. Thereafter, in step 705, an indication will be provided that the bill has yet to be paid in full. FIG. 6 does not illustrate the red, green and yellow lamps as shown in FIG. 2, but these can be implemented on unit 601 as well. In step 706, the system loops until a credit card number has been entered by a patron, either using the touch-sensitive screen 603 to enter in digits on a displayed virtual numeric keypad (not shown), or by swiping a credit card through credit card reader 602. Once a patron has entered a credit card number, the process proceeds to step 707 where a request is made of the credit card holder to select items the credit card holder wishes to pay for. Such a request can be made using a message displayed on display 603. The credit card holder will then select items they wish to pay for using the touch-sensitive screen, in a manner well known in the art. For example, referring to the exemplary list of items shown in FIG. 6, this credit card holder could select to pay for the #1 Plate and for the Coffee by touching those items on the touch-sensitive screen 603. In step 708, as each item is selected by the credit card holder, a subtotal of such items is maintained, and will be displayed to the credit card holder in response to some type of action, such as pressing a virtual ENTER button on display 603. Along with the subtotal of items selected by the credit card holder, the system will also compute and display the tax associated with such items, and may also compute suggested gratuity amounts for the credit card holder. For example, for the subtotal of items and tax selected by the first credit card holder, suggested 15% and 20% gratuity amounts can also be displayed for selection by the credit card holder. In step 709, the holder of the credit card will then be requested to confirm their computed subtotal plus tax, and to select one of the suggested gratuity amounts, or to enter a different gratuity amount using the virtual numeric key pad, which can also be displayed. In step 710, the grand total for that particular credit card holder will then be computed and displayed, and in step 711, that amount will be subtracted from the total amount of the bill to determine if the total amount of the bill has now been paid. If not, in step 714, the remaining balance will be displayed and the process will return to step 706 to repeat steps 706-711 until the entire total bill for the food and tax have been paid by the patrons responsible for this bill. Once the total bill has been paid, the process will proceed from step 711 to step 712 to indicate that the bill has been paid in full, and the payment information for the various credit card holders who entered their information will be transmitted to the respective financial institutions in step 713.

Figure 3:
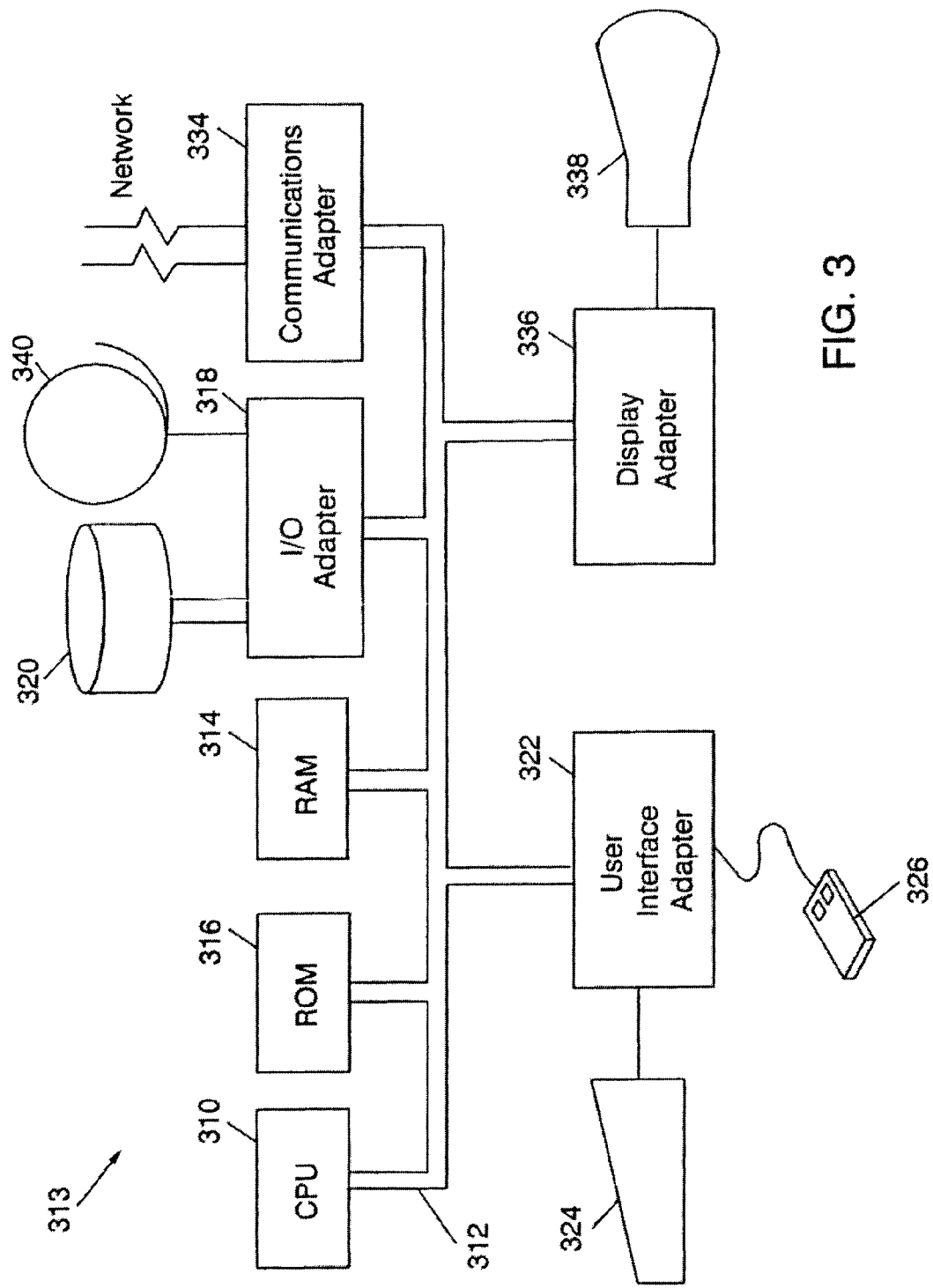
FIG. 3 illustrates a block diagram of a data processing system configurable in accordance with the present invention.

The various units illustrated in FIG. 1 can each be implemented using a typical data processing system, such as the one illustrated in FIG. 3.

Referring first to FIG. 3, an example is shown of a data processing system 300 which may be used for the invention. The system has a central processing unit (CPU) 310, which is coupled to various other components by system bus 312. Read only memory ("ROM") 316 is coupled to the system bus 312 and includes a basic input/output system ("BIOS") that controls certain basic functions of the data processing system 300. Random access memory ("RAM") 314, I/O adapter 318, and communications adapter 334 are also coupled to the system bus 312. I/O adapter 318 may be a small computer system interface ("SCSI") adapter that communicates with a disk storage device 320. Communications adapter 334 interconnects bus 312 with an outside network enabling the data processing system to communicate with other such systems. Input/Output devices are also connected to system bus 312 via user interface adapter 322 and display adapter 336. Keyboard 324 and mouse 326 are all interconnected to bus 312 via user interface adapter 322. Display monitor 338 is connected to system bus 312 by display adapter 336. In this manner, a user is capable of inputting to the system throughout the keyboard 324 or mouse 326 and receiving output from the system display 338.

Preferred implementations of the invention include implementations as a computer system programmed to execute the method or methods described herein, and as a computer program product. According to the computer system implementation, sets of instructions for executing the method or methods are resident in the random access memory 314 of one or more computer systems configured generally as described above. Until required by the computer system, the set of instructions may be stored as a computer program product in another computer memory, for example, in disk drive 320 (which may include a removable memory such as an optical disk or floppy disk for eventual use in the disk drive 320). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. In a restaurant, a system comprising:
   a waiter's terminal for inputting orders of food items ordered by a plurality of patrons at a table;
   a first program code for computing a total amount owed by the plurality of patrons for the ordered food items;
   a payment unit physically located at the table;
   transmission circuitry for transmitting the total amount from the waiter's terminal to the payment unit;
   a display screen on the payment unit for displaying the total amount to the plurality of patrons;
   a credit card reader on the payment unit for receiving first credit card information from a first credit card swiped through the credit card reader by a first one of the plurality of patrons;
   a numeric input pad on the payment unit for receiving a first portion entered by the first one of the plurality of patrons, wherein the first portion represents an amount of money to be paid by the first one of the plurality of patrons by a debit to an account of the first credit card;
   a second program code for automatically calculating a balance owed on the total amount, wherein the balance owed equals the total amount minus the first portion;
   a third program code for automatically determining if the balance owed equals zero;
   a fourth program code for automatically displaying the balance owed on the display screen;
   the credit card reader receiving second credit card information from a second credit card swiped through the credit card reader by a second one of the plurality of patrons when the balance owed is greater than zero;
   the numeric input pad receiving a second portion entered by the second one of the plurality of patrons, wherein the second portion represents an amount of money to be paid by the second one of the plurality of patrons by a debit to an account of the second credit card;
   a fifth program code for automatically calculating a balance owed on the total amount, wherein the balance owed equals the total amount minus the first and second portions;
   a sixth program code for automatically determining if the balance owed equals zero; and
   a seventh program code for automatically displaying the balance owed on the display screen.

2. The system as recited in claim 1, further comprising:
   circuitry for transmitting the credit card information and payment information received by the payment unit for processing when the balance owed is equal to zero.

3. The system as recited in claim 2, wherein the first program code for computing the total amount includes program code for computing an applicable tax amount to be added as part of the total amount owed by the plurality of patrons.

4. The system as recited in claim 3, wherein the applicable tax amount is also displayed on the display screen of the payment unit at the table.

5. The system as recited in claim 1, further comprising:
   a lamp of a first color illuminated on the payment unit indicating that the balance owed is not equal to zero.

6. The system as recited in claim 5, further comprising:
   a lamp of a second color illuminated on the payment unit indicating that the balance owed is equal to zero.

7. The system as recited in claim 1, further comprising:
   an eighth program code for computing a suggested gratuity to be paid by the plurality of patrons; and
   the display screen displaying the suggested gratuity.

8. The system as recited in claim 7, wherein the suggested gratuity is computed as a function of a percentage of the total amount, and further comprising the display screen displaying the percentage with the displayed suggested gratuity.

9. The system as recited in claim 1, further comprising:
   program code for displaying on the display screen a request for the plurality of patrons to add a gratuity to the total amount.

10. The system as recited in claim 9, further comprising:
    the numeric input pad for receiving an input from one of the plurality of patrons to add the gratuity to the total amount.

11. The system as recited in claim 1, wherein the display screen is a touch-sensitive screen that displays a list of the food items and their respective costs.

12. The system as recited in claim 11, wherein the receiving of the first portion entered by the first one of the plurality of patrons into the payment unit is performed by recognizing one or more touches by the first one of the plurality of patrons of a selected one or more of the food items displayed on the touch-sensitive screen.

13. The system as recited in claim 1, wherein the display screen displays a list of the food items.

14. The system as recited in claim 13, wherein the receiving of the first portion entered by the first one of the plurality of patrons into the payment unit is performed by recognizing one or more selections, using a means for data entry, by the first one of the plurality of patrons of a selected one or more of the food items displayed on the display screen.

15. A payment unit operable for permitting a plurality of patrons to pay a bill at a table comprising:
- receiving circuitry for receiving from a waiter's terminal a total amount owed by the plurality of patrons for ordered food items;
- a display screen on the payment unit for displaying the total amount to the plurality of patrons;
- a credit card reader on the payment unit for receiving first credit card information from a first credit card swiped through the credit card reader by a first one of the plurality of patrons;
- a numeric input pad on the payment unit for receiving a first portion entered by the first one of the plurality of patrons, wherein the first portion represents an amount of money to be paid by the first one of the plurality of patrons by a debit to an account of the first credit card;
- a first program code for automatically calculating a balance owed on the total amount, wherein the balance owed equals the total amount minus the first portion;
- a second program code for automatically determining if the balance owed equals zero;
- a third program code for automatically displaying the balance owed on the display screen;
- the credit card reader receiving second credit card information from a second credit card swiped through the credit card reader by a second one of the plurality of patrons when the balance owed is greater than zero;
- the numeric input pad receiving a second portion entered by the second one of the plurality of patrons, wherein the second portion represents an amount of money to be paid by the second one of the plurality of patrons by a debit to an account of the second credit card;
- a fourth program code for automatically calculating a balance owed on the total amount, wherein the balance owed equals the total amount minus the first and second portions;
- a fifth program code for automatically determining if the balance owed equals zero; and
- a sixth program code for automatically displaying the balance owed on the display screen.

16. The payment unit as recited in claim 15, wherein the first program code for computing the total amount includes program code for computing an applicable tax amount to be added as part of the total amount owed by the plurality of patrons.

17. The payment unit as recited in claim 16, wherein the applicable tax amount is also displayed on the display screen of the payment unit at the table.

18. The payment unit as recited in claim 15, further comprising:
- a lamp of a first color illuminated on the payment unit indicating that the balance owed is not equal to zero.

19. The payment unit as recited in claim 18, further comprising:
- a lamp of a second color illuminated on the payment unit indicating that the balance owed is equal to zero.

20. The payment unit as recited in claim 15, further comprising:
- a seventh program code for displaying a suggested gratuity to be paid by the plurality of patrons.

21. The payment unit as recited in claim 20, wherein the suggested gratuity is computed as a function of a percentage of the total amount, and further comprising the display screen displaying the percentage with the displayed suggested gratuity.

22. The payment unit as recited in claim 15, further comprising:
- program code for displaying on the display screen a request for the plurality of patrons to add a gratuity to the total amount.

23. The payment unit as recited in claim 22, further comprising:
- the numeric input pad for receiving an input from one of the plurality of patrons to add the gratuity to the total amount.

24. The payment unit as recited in claim 15, wherein the display screen is a touch-sensitive screen that displays a list of the food items and their respective costs.

25. The payment unit as recited in claim 24, wherein the receiving of the first portion entered by the first one of the plurality of patrons into the payment unit is performed by recognizing one or more touches by the first one of the plurality of patrons of a selected one or more of the food items displayed on the touch-sensitive screen.

26. The system as recited in claim 15, wherein the display screen displays a list of the food items.

27. The system as recited in claim 26, wherein the receiving of the first portion entered by the first one of the plurality of patrons into the payment unit is performed by recognizing one or more selections, using a means for data entry, by the first one of the plurality of patrons of a selected one or more of the food items displayed on the display screen.

* * * * *